June 16, 1936.  G. WEINREICH ET AL  2,044,599

POWER TRANSMISSION

Filed April 11, 1932  2 Sheets-Sheet 1

Inventors:
George Weinreich
Robert H. Nickel.
By Herbert G. Fletcher
Atty.

June 16, 1936.    G. WEINREICH ET AL    2,044,599
POWER TRANSMISSION
Filed April 11, 1932    2 Sheets-Sheet 2
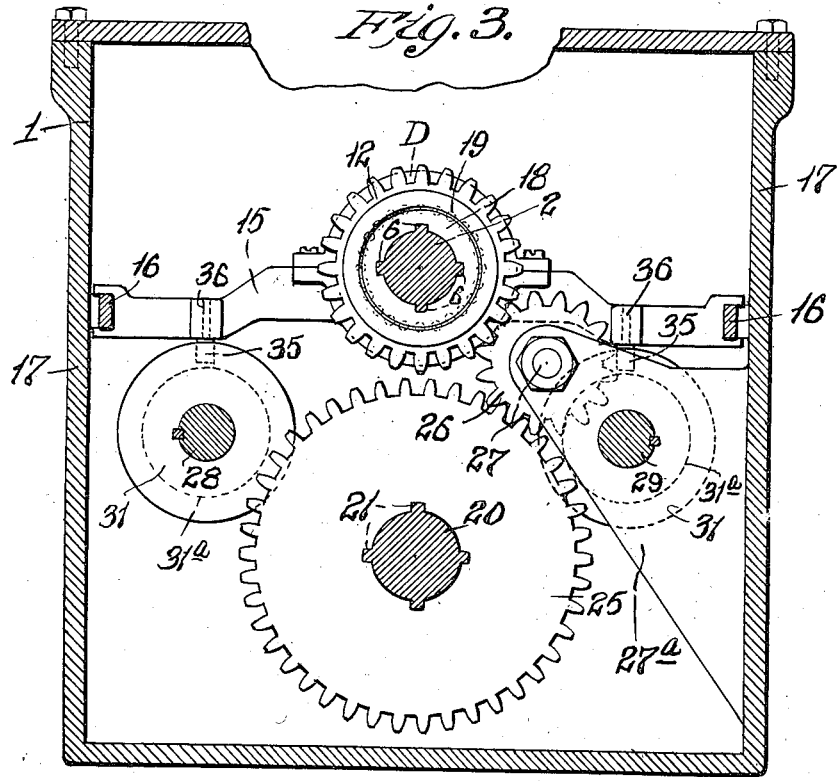
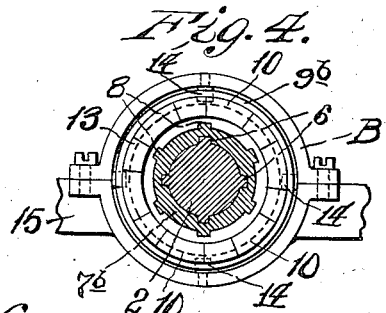
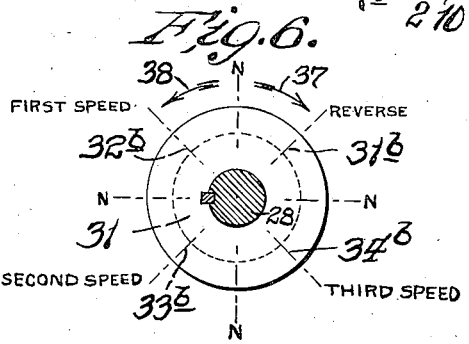
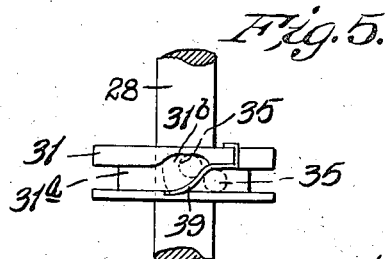
Inventors:
George Weinreich
Robert H. Nickel.
By Herbert G. Ritchey
Atty.

Patented June 16, 1936

2,044,599

UNITED STATES PATENT OFFICE 2,044,599

POWER TRANSMISSION

George Weinreich, Oakville, and Robert H. Nickel, St. Louis, Mo.

Application April 11, 1932, Serial No. 604,476

1 Claim. (Cl. 74—337.5)

This invention relates to certain new and useful improvements in power transmissions for automobiles and the like and particularly that class of transmissions having changeable speeds and the gearing permitting changeable driving speeds being in constant mesh.

The primary object of the invention is in providing the power transmission with improved means for actuating the shifting means for changing the driving gear ratio.

Another object of the invention is in providing improved means for shifting the power transmitting means on the power shaft into engagement with a selected power transmitting gear.

A further object of the invention is in providing a power transmission system with improved selecting means which is cooperable with the power transmitting parts on the power shaft.

A still further object of the invention is in providing a power transmission system with rotatable selective means which is cooperable with the power transmitting means of the system.

Another still further object of the invention is in providing a transmission system with improved selective means which is cooperable with the shiftable transmitting parts on the power shaft for alternately shifting them either into or out of cooperative engagement with respective power transmitting gears, during any rotative speed of the power shaft.

Other and further objects will appear in the specification and be specifically pointed out in the appended claims, reference being had to the accompanying drawings, exemplifying the invention, and in which:—

Figure 3 is a vertical transverse section taken approximately on the line III—III of Fig. 1.

Figure 4 is a fragmentary vertical transverse section taken approximately on the line IV—IV of Fig. 1.

Figure 5 is a fragmentary plan view of Fig. 6.

Figure 6 is a front elevation of one of the shifting cam wheels of the selective shifting means, the shaft on which the wheel is mounted being shown in section.

Figure 1:
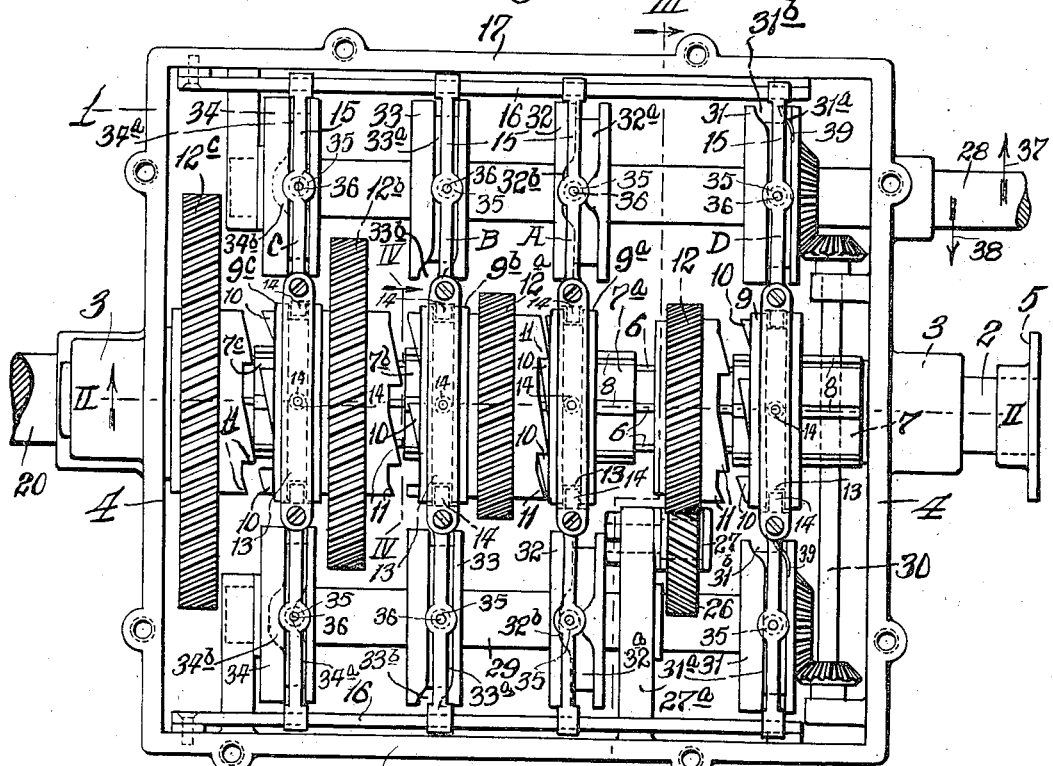
Figure 1 is a plan view of a power transmission showing the invention in connection therewith, the enclosing housing having the top cover removed.

Referring by numerals to the accompanying drawings, 1 designates a housing having a power shaft 2 longitudinally disposed therethrough and supported in respective end bearings 3 that are formed on respective end walls 4 of the housing 1.

The power shaft 2 is adapted to be coupled in alinement with a motor shaft (not shown) by the coupling flange 5 and formed on or secured on the shaft 2 are a plurality of longitudinally extending keys 6 which are disposed on the shaft inwardly of the ends thereof.

Mounted on the shaft 2 between the end walls 4 of the housing 1 and prevented from rotation thereon by the keys 6 are a plurality of spaced bushings numbering 7, 7a, 7b, and 7c, each having a plurality of keys 8 on their outer peripheries, said bushings being held against longitudinal movement on the shaft 2. Longitudinally slidable on each of the bushings and turnable therewith by the keys 8 are respective collars 9, 9a, 9b and 9c, each being provided with a series of side disposed clutch teeth 10 and for cooperation with each series of teeth are clutch teeth 11 which are side disposed on the hubs of respective gears 12, 12a, 12b and 12c, each of the gears 12, 12a, 12b and 12c being rotatable on the shaft 2 by means hereinafter described.

Each of the collars 9, 9a, 9b and 9c are provided with an annular groove 13 and engaged in each groove are a series of spaced rollers 14, each roller series being carried by respective shifting bars 15 which are transversely disposed in the housing 1, the ends of each bar 15 being slidably supported on respective longitudinally disposed rails 16 which are supported from the inner surface of respective side walls 17 of the housing 1.

Each of the gears 12, 12a, 12b and 12c is provided with an inner hub 18 which is fixed against turning and sliding on the shaft 2 by the keys 6, the outer hub of each gear and the gear itself being turntable on respective inner hubs 18 by the ball bearings 19 of each hub 18.

Longitudinally and parallelly disposed beneath the power shaft 2 is a drive shaft 20 and formed or mounted on said shaft are a plurality of keys 21 and fixed on said shaft by said keys is a gear 22 in mesh with the gear 12a, a gear 23 in mesh with the gear 12b and a gear 24 in mesh with the gear 12c and fixed on said drive shaft 20 forwardly of the gear 22 is a gear 25, said gear 25 being cooperable with the gear 12 on the power shaft 2 by the intermediate gear 26 which is mounted on the pin 27, said pin extending from a bracket 27a.

Paralleling the power shaft 2 on each side thereof on a plane therebelow are a pair of shafts 28 and 29 which are turnably supported in the housing 1, the shaft 28 being extended at one end from the housing and being adapted to be flexibly connected to a turnable means (not shown) which may be located adjacent the operator of an automobile so that when the shaft 28 in turned by the operator, turning motion will be imparted to the shaft 29 through the bevel gear driven shaft 30 which connects said shafts 28 and 29 as shown in Fig. 1.

Securely fixed to each shaft 28 and 29 are four cam wheels 31, 32, 33 and 34, each being provided with an annular guideway 31a, 32a, 33a and 34a, each guideway having respective offset portions 31b, 32b, 33b and 34b and depended in each guideway is a roller 35, each roller being supported on a pin 36 of which a pair are carried by each shifting bar 15 as shown in Figs. 1 and 3.

The cam wheels of the shaft 28 are spaced thereon in positions corresponding to the cam wheels on the shaft 29 so that the cam wheels of respective shafts will be oppositely disposed and the offset portions of the guideways of the cam wheels of respective shafts will be correspondingly positioned so that when the shaft 28 is turned, the offset portions 31b, 32b, 33b and 34b of the opposing pairs of cam wheels 31, 32, 33 and 34, will be simultaneously travelled.

Figure 2:
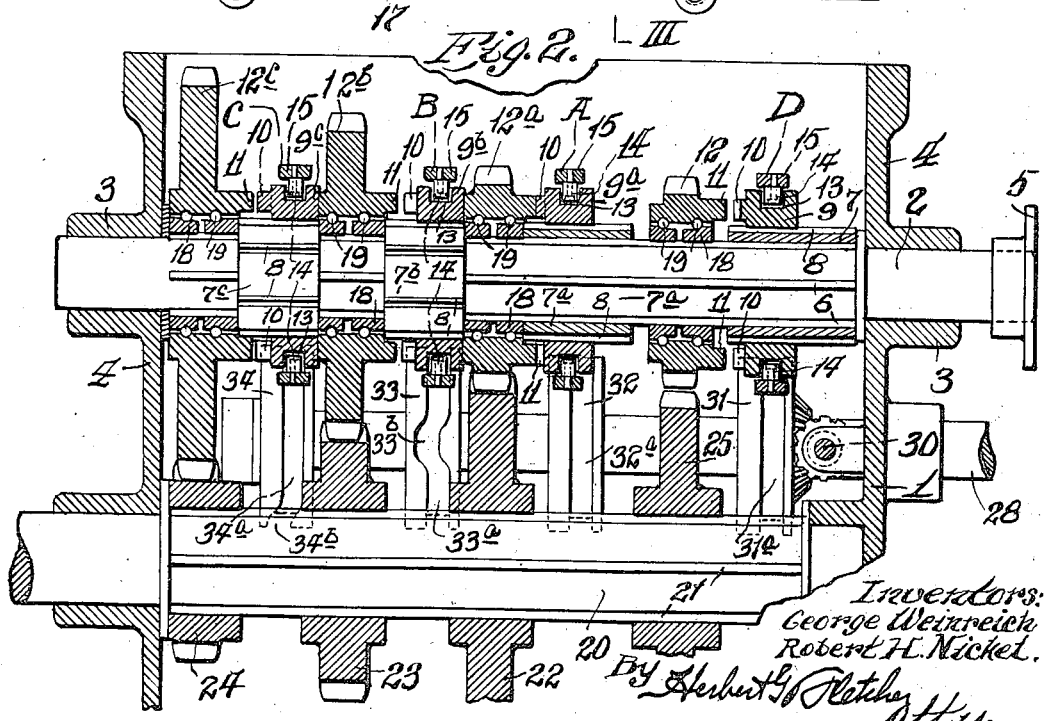
Figure 2 is a vertical longitudinal section taken approximately on the line II—II of Fig. 1.

When a vehicle having this improved transmission is standing still, the shifting devices of the transmission obviously will be in neutral position, and when it is desired to place the vehicle in motion, the operator upon turning the shaft 28 in the direction of the arrow 37 (by means of a lever on the flexible end not shown of the shaft which may be positioned on the instrument board or the steering wheel shaft or any other convenient place), will cause the shafts 28 and 29 and cam wheels thereon to be turned and in the travel of the cam wheels, the offset portions 32b of the cam wheels 32 will engage respective rollers 35 of the shifting bar 15, which is further designated as A, thereby shifting said bar and the collar 9a cooperable therewith to a position wherein the teeth 10 of the collar will engage the teeth 11 of the loosely mounted gear 12a as shown in Figs. 1 and 2. The gear 12a may be termed the first "forward speed" gear of the transmission and the clutching of the collar 9a thereof which is keyed to the shaft 2 by the intermediate bushing 7a will cause said gear 12a to rotate and as said gear is in mesh with the driving gear 22, the drive shaft 20 which is adapted to transmit power to the traction wheels of the vehicle will be operated.

Further turning of the shaft 28 by the operator in the direction of the arrow 37 will cause the offset portions 32b of respective cam wheels 32 to force the rollers 35 of shifting bar A into the straightways of the guideways 32a thereby causing the collar 9a to be shifted so that the teeth 10 thereof will be unmeshed from the teeth 11 of the gear 12a and immediately thereafter the offset portions 33b of the guideway 33a of respective cam wheels 33, will engage respective rollers 35 of the shift bar 15 further designated as B, thus causing said shift bar to slide the collar 9b so that the teeth 10 thereof will engage the teeth 11 of the loosely mounted gear 12b, this gear representing the second "forward speed" of the transmission. The gear 12b is in mesh with the gear 23 which is rigidly fixed to the drive shaft 20.

The operator upon desiring a higher speed of rotation of the drive shaft 20, upon turning the shaft 28 further in the direction of the arrow 37, will cause the offset portions 33b of the cam wheels 33 to force the collar 9b and the teeth 10 thereof out of mesh with the teeth 11 of the gear 12b, and immediately thereafter the offset portions 34b of the cam wheels 34 will be brought into forcing positions with the rollers 35 of the shift bar 15 further designated as C thus sliding the collar 9c and the teeth 10 thereof in engagement with the teeth 11 of the high speed gear 12c which is in mesh with the gear 24 rigidly secured to the drive shaft 20.

Further turning of the shaft 28 in the direction of the arrow 37 will cause the offset portions 34b of the cam wheels 34 to force the shift bar C back into neutral position in which the rollers 35 thereof will be returned to the straightway portions of the guideways 34a and consequently the teeth 10 of the collar 9c will be moved from mesh with the teeth of the gear 12c thereby disconnecting the driving force from the power shaft to the drive shaft 20.

From the above description of the operation of the shafts 28 and 29 and the cam wheels thereon, it is obvious that when the rollers 35 of respective shift bars 15 are in the straightway portions of the guideways of said cam wheels, that this position is neutral to all of the cam wheels and that when the rollers 35 of a respective shift bar 15 are in a relatable pair of offset portions of a respective pair of cam wheels, that all other of the rollers 35 of the remaining shift bars 15 are in neutral positions in their respective cam wheels, therefore but one shift bar 15 at a time can be operated for transmitting power from the power shaft 2 to the drive shaft 20.

Obviously, if the shift bar C is in moved position for transmitting rotary motion from the collar 9c to the gear 12c, and it is desired that a lower speed be used such as by operation of the gear 12b, reverse turning motion of the shaft 28 in the direction of the arrow 38, will cause the offset portions 34b of the cam wheels 34 to force the rollers 35 of the shift bar C into neutral position and further turning of the shaft will cause the offset portions 33b of the cam wheels 33 to engage the rollers 35 of the shift bar B for moving the collar 9b and the clutch teeth 10 thereof into mesh with the teeth 11 of the gear 12b. Further turning of the shaft 28 in the direction of the arrow 38, will cause the teeth 10 of the collar 9b to be moved from meshing engagement with the teeth 11 of the gear 12b and if the turning movement of the shaft 28 is great enough, the shift bar A will be operated to clutch the collar 9a with the teeth of the gear 12a.

Further rearward turning movement of the shaft 28 in the direction of the arrow 38, will cause the rollers 35 of the shift bar D to move the collar 9 and the teeth 11 thereof into mesh with the gear 12 and as said gear is in mesh with the idle or intermediate gear 26 and said gear 26 being in mesh with the gear 25 which is fixed to the drive shaft 20, reverse rotary motion will be transmitted to the gear 25 from the gear 12 by the intermediate gear 26.

Attention is directed to Fig. 6 which is intended to show the radial dispositions of the operating positions of the offset or actuating portions 32b, 33b, 34b and 31b of respective cam wheels on respective shafts 28 and 29, the position of said offset portions of respective cam wheels being indicated in Fig. 6 as first speed, second speed, third speed and reverse respectively and the neutral positions or straightway portions of the guideways of the cam wheels being designated as N. From an inspection of Fig. 6 and the indicated positions thereon, which positions in this instance are shown as indicating neutral positions with respect to the transmission, it is apparent that if the shaft 28 is turned in the direction of the arrow 37, that first speed will be effected whereas if the arrow is turned in the direction of the arrow 38, that reverse speed will be effected.

From the specific location of the offset or actuating portions of the cam wheels as indicated in Fig. 6, it is to be noted that less than one revolution of the shafts 28 and 29 is required to manipulate the shifting bars A, B and C for providing the shifts, first speed, second speed and third speed; and from third speed, further turning of the shafts 28 and 29 will provide a neutral position in the event it is desired to stop the vehicle or to permit coasting or "free wheeling" of the vehicle and in fact any positioning of the cam wheels so that the rollers 35 of the shifting bars are in the straightway portions of the guideways will provide for coasting or "free wheeling".

Assuming that the shafts 28 and 29 have been operated through first speed to third speed, and the vehicle is stopped, and eventually the motor is started for further travel of the vehicle, it is not necessary for the operator to backwardly turn the shafts 28 and 29 but rather the operator if he desires may turn the shaft 28 in the direction of the arrow 37 until the first speed portions 32b of relatable cam wheels are brought into position to be effective on the rollers 35 of the shifting bar A.

In this event, the guard leaf spring 39 of respective offset portions 31b of cam wheels 31, are forced to one side as they pass the rollers 35 of the shifting bar D. The guard leaf springs 39 are for the purpose of providing a cross-over for the rollers 35 of the shifting bar D while turning the shafts 28 and 29 from third to first speed position, so that no reverse action through the gear 12 will be effected. Also, in the event the vehicle is stopped while the shafts 28 and 29 are in third speed positions and the operator desires to use the reverse gearing, the operator need only turn the shaft 28 in the direction of the arrow 37 until the leaf springs 39 pass respective rollers 35 of the shifting bar D, then the turning motion of the shaft 28 is reversed and the curvature of the springs 39 will force respective rollers 35 into relatable offset portions 31b of the cam wheels 31.

From the aforesaid description of the improvements in a transmission system as set forth, it is obvious that an improved shifting means for the power transmitting parts of the power shaft and an improved cooperable turnable selecting means for the shifting means is provided and while one illustrative embodiment of the invention has been described in detail, it is not our intention to limit its scope to that particular embodiment or otherwise than by the terms of the appended claim.

What we claim is:—

A power transmission having paralleling power and drive shafts and gears on said shafts in constant mesh, the gears on said power shaft being loosely mounted, a separate clutch member for each gear mounted on said power shaft, a separate shifting member for each clutch member, a horizontal guiding rail for the ends of all of said shifting members, a cam shaft paralleling said power and said drive shafts on each side thereof and having peripherally grooved cams thereon for separate cooperation with said shifting members, and geared means connecting said cam shafts.

GEORGE WEINREICH.
ROBERT H. NICKEL.